United States Patent [19]

Howe

[11] Patent Number: 4,914,156

[45] Date of Patent: Apr. 3, 1990

[54] BLOW MOLDING POLYESTER COMPOSITIONS

[75] Inventor: King L. Howe, Wilmington, Del.

[73] Assignee: E. I. Du Pont de Nemours and Company, Wilmington, Del.

[21] Appl. No.: 132,487

[22] Filed: Dec. 14, 1987

[51] Int. Cl.$^4$ .............................................. C08L 67/02
[52] U.S. Cl. ................................... 525/166; 525/165; 525/176; 524/398; 524/399
[58] Field of Search ....................... 525/166, 176, 165; 524/398, 399

[56] References Cited

U.S. PATENT DOCUMENTS

| | | | |
|---|---|---|---|
| 3,005,795 | 10/1961 | Busse et al. | 260/45.5 |
| 3,723,373 | 3/1973 | Lucas | 525/165 |
| 4,034,013 | 7/1977 | Lone | 260/835 |
| 4,246,378 | 1/1981 | Kometani et al. | 525/4 |
| 4,284,540 | 8/1981 | Iida et al. | 260/72 R |
| 4,659,757 | 4/1987 | Okawoto et al. | 523/426 |

FOREIGN PATENT DOCUMENTS 59-184251 10/1984 Japan .

OTHER PUBLICATIONS

Abstract of J 52129759-A, Oct. 13, 1977.
Abstract of J 54162750-A, Dec. 24, 1979.

*Primary Examiner*—Patricia Short

[57] ABSTRACT

A blow moldable composition of a polyether, an epoxide polymer, a source of catalytic cations, and a fibrillatable tetrafluoroethylene polymer.

4 Claims, No Drawings

BLOW MOLDING POLYESTER COMPOSITIONS

BACKGROUND OF THE INVENTION

Polyesters that are semicrystalline, particularly poly(butylene terephthalate) and poly(ethylene terephthalate), are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blow molding provided the polymer system has adequate melt strength and viscosity. Unfortunately, polyesters commonly used for injection molding have melt viscosities which are too low to make them suitable for extrusion blow molding. High molecular weight polyesters can be made by solid phase polymerization of polymers suitable for injection molding, but this operation raises the cost of the polyesters substantially. It would be desirable to have blow moldable polyester compositions made from the commercial injection moldable grades of polyesters.

For many applications the inherent rigidity of semicrystalline polyesters is important. The addition of conventional di- or poly-epoxides and, more recently, the addition of ethylene copolymers containing glycidyl groups have been suggested for increasing the melt strength and viscosity of polyesters (see Kometani et al., U.S. Pat. No. 4,246,378). These solutions to the problem have improved polyesters for certain blow molding applications but have proved to be inadequate in providing materials suitable for blow molding large objects having complex cross-sections such as automobile parts. Another problem encountered in the use of the epoxide-containing additives is their effect on modulus or rigidity of the final molded parts. The amount of epoxide-containing additives required to significantly increase melt strength at the same time reduces rigidity. This is particularly true for the ethylene copolymers containing glycidyl groups. While these copolymers are generally effective for increasing melt strength they do lead to a substantial loss of rigidity because of their rubbery nature. Therefore, a need still exists for readily blow moldable polyester compositions which retain the high modulus of unmodified polyesters to a greater degree.

SUMMARY OF THE INVENTION

In the instant invention the melt strengths and melt viscosities of polyesters are increased substantially by the combination of (1) the addition of a limited amount of an epoxy-containing copolymer along with a source of cations which are effective catalysts for epoxide reactions and (2) the addition of small amounts of a fibrillatable fluoropolymer resin. In order to achieve the desired melt strength while at the same time retaining the inherent rigidity of the polyester, both the epoxy-containing copolymer plus catalytic cation source and the fibrillatable fluoropolymer resin are required. Neither additive alone in the amounts contemplated so as to retain rigidity provides the processibility required for blow molding large, complex parts.

The use of specific cationic epoxide catalysts represents a further critical aspect of the instant invention, since the presence of these catalysts in specified concentrations provides the maximum increase in melt strength which can be achieved for the addition of a given amount of epoxy-containing copolymer. The epoxy-containing copolymer must be utilized efficiently since the amount which can be added is limited by the need to retain a high modulus in the finished product.

The compositions are melt blends of mixtures consisting essentially of:

(a) 80-95 parts by weight of a semicrystalline polyester;

(b) 5-20 parts by weight of a copolymer containing epoxide groups;

(c) 0.01 to 3.0 parts by weight of a source of catalytic cations selected from the group consisting of metal salts of hydrocarbon mono-, di-, or poly-carboxylic acids and metal salts of polymers containing carboxyl groups, said cations being selected from the group consisting of $Al^{+++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$; and (d) 0.1-3.0 parts by weight of a fibrillatable fluoropolymer resin.

These compositions have high melt strength and high melt viscosity compared to the base polyester. These properties aid in making the compositions blow moldable. The compositions are readily processible by extrusion blow molding to make hollow parts, such as containers or automotive components.

DETAILED DESCRIPTION OF THE INVENTION

The polyester resins useful as component (a) are well known in the art. The polyester resins are usually prepared by melt condensation of one or more dicarboxylic acids with one or more glycols. Usually the glycol is employed in a stoichiometric excess relative to the diacid.

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl)methane, anthracene dicarboxylic acid, 4,4-diphenylether dicarboxylic acid; aliphatic dicarboxylic acids such as adipic acid; cycloaliphatic dicarboxylic acids such as 1,4-cyclohexane dicarboxylic acid and the like; or ester forming compounds thereof.

The glycols suitable for preparing polyesters in accordance with the present invention include aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol, and 1,4-cyclohexanedimethanol.

Poly(ethylene terephthalate) and poly(butylene terephthalate) are preferred with the latter being especially preferred. Blends of two or more polyesters may also be used with blends of poly(ethylene terephthalate) and poly(butylene terephthalate) being preferred.

As previously indicated, the polyesters preferred for use in this invention are prepared by melt condensation and are quite suitable for injection molding as such but not for blow molding. Typically, the melt viscosity of those polyesters would be from 4000-7000 poise at 260° C., $10^2$ sec$^{-1}$ for poly(butylene terephthalate) and 1000-5000 poise at 270° C., $10^2$ sec$^{-1}$ for poly(ethylene terephthalate).

The epoxide group-containing copolymers which serve as component (b) contain recurring units of the monomers:

(1)

wherein R=H or alkyl of 1-6 carbon atoms.

The copolymer will also contain one or more of the following (2) $CH_2=CHR$ where $R_2=H$, lower alkyl or phenyl
(3) $CH_2=C(R_1)COOR_2$ where $R_1=H$ or lower alkyl and $R_2=$ alkyl of 1-8 carbons
(4) $RCOOCH=CH_2$ where R=lower alkyl
(5) CO (carbon monoxide); and include polymers derived from monomers of class (1) with monomers of class (2) either alone or in admixture with monomers of classes (3), (4) and/or (5); and polymers derived from monomers of class (1) with monomers of class (3) either alone or in admixture with monomers of class (4).

Thus, the polymers may be dipolymers derived from one or more monomers of classes (1) and (2) of which ethylene/glycidyl methacrylate copolymers are representative. More preferred are terpolymers containing one or more monomers selected from classes (3), (4) or (5) in addition to monomers from classes (1) and (2). Examples of these terpolymers include polymers of ethylene/vinyl acetate/glycidyl methacrylate and ethylene/alkyl (meth)acrylate/glycidyl methacrylate.

The epoxide group-containing polymers may also be derived from one or more monomers of classes (1) and (3) of which methyl methacrylate/butyl acrylate/glycidyl methacrylate polymers are representative. These polymers may also contain units derived from monomers of class (4), illustrative of which is methyl methacrylate/vinyl acetate/glycidyl methacrylate terpolymer.

The concentration of monomers of class (1), the glycidyl esters, may vary from about 0.5-15% by weight, preferably 1-7% by weight, in th epoxide group-containing polymers described hereinbefore.

Olefin polymers derived from monomer classes (1) and (2) and further containing up to about 40% by weight of units derived from one or more monomers of classes (3), (4) and (5) are preferred. Especially preferred are terpolymers of ethylene containing 10-30% by weight butyl acrylate and 1-7% by weight glycidyl methacrylate.

In order to confer blow moldability to the polyester, while retaining rigidity, the epoxide-containing polymer must be used in amounts of 5-20 parts by weight per 100 parts of components (a) and (b). Preferably 7-12 parts of component (b) are employed. If the epoxide content of component (b) is low, the amount of component (b) used should be on the high side of the ranges given above. Conversely, if the epoxide content of component (b) is high, less of component (b) is required. Fifteen parts of a terpolymer containing about 5% by weight of glycidyl methacrylate has been found to give excellent processing in blow molding operations when used in conjunction with component (d), the fibrillatable fluoropolymer resin.

Component (c) of the present invention has been described as a source of catalytic cations. Suitable catalytic cations include $Al^{+++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$. The concentration of catalytic cations used is critical in achieving the desired results of this invention. If the amount of cation is either too great or too small, the melt strength of the melt blend will not be adequate for good processibility by blow molding.

Compounds which can serve as a source of catalytic cations include salts of hydrocarbon mono-, or di-, or polycarboxylic acids such as metallic salts of acetic acid, stearic acid, dimer acid and trimer acid.

Ionomers derived by reacting carboxyl group-containing polymers with a metal compound capable of neutralizing the polymer are also useful as sources of catalytic cations. The base copolymer may contain carboxylic acid groups along the main chain and optionally may have terminal acid functionality. Suitable base copolymers and ionomers derived therefrom are described in U.S. Pat. Nos. 3,264,272 and 4,187,358.

Suitable base copolymers include homopolymers of ethylene, copolymers of ethylene and higher olefins such as propylene, 1-butene or 1-hexane, or terpolymers such as EPDM and other polymers as described in U.S. Pat. No. 4,026,967 which have been acid functionalized by reaction with an unsaturated carboxylic acid or anhydride.

Also included are base copolymers of ethylene and optionally other olefins with polymerizable unsaturated acids or their functional derivatives such as anhydrides, or half esters of diacids, e.g. the monoethyl ester of maleic acid.

Also included are base copolymers of alkyl acrylates, alkyl methacrylates, styrene, etc. with optionally other polymerizable unsaturated monomers and polymerizable carboxylic acids, or other functional derivatives such as carboxylic acid anhydrides or half esters of diacids.

The ionomer can be produced by reacting the base copolymer with a formate, acetate, hydroxide, oxide, methoxide, carbonate, etc. of the above metals. The ionomer may also be prepared in situ during the blending operation by introducing the base copolymer along with suitable metal oxides, hydroxides, carbonates, and the like. The preformed ionomers are preferred.

The amount of the catalytic cation source to be used is from 0.01-3.0 parts by weight per 100 parts of components (a) and (b) combined. For cation sources which contain a large proportion of cation, best results are obtained by operating in the lower part of the concentration range. Conversely, cation sources low in cation should be used in larger amounts within the above range. For instance, 0.035 parts of zinc diacetate dihydrate (containing about 30% Zn) or 0.5 parts of zinc ionomer (containing about 2% Zn) each give excellent results. The $Zn^{++}$ cation is preferred and it normally is used in amounts of 0.05 to 0.5 millimoles per 100 grams of components (a) and (b) combined.

Component (d), the fibrillatable fluoropolymer resin, is preferably a non-melt-fabricable tetrafluoroethylene polymer. The tetrafluoroethylene polymers are made by an emulsion polymerization process, in which the polymer particles formed remain dispersed in the reaction mix during the polymerization. The particles may be coagulated and dried. The particles fibrillate while being physically mixed into the composition of the invention.

The fibrillatable PTFE is a well known material in the art and readily available as a commercial product. The commercially available fibrillatable PTFE is in the form of an aqueous dispersion prepared by the emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 m while the powdery products are agglomerates of these particles, having a diameter of about 0.5 micrometers. The PTFE particles of either form can be readily converted into fibriss when the particles are subjected to the mechanical shearing forces required to make the present compositions.

Several examples of commercially available fibrillatable PTFE are as follows: Teflon ® 6J (a product of Mitsui Fluorochemical Co.), Teflon ® 6JC (a product by the same company, Polyflon F-103 (a product of Daikin Kogyo Co.) and Polyflon F-201 (a product by the same company) as the examples of the powdery products and Teflon ® 30-J (a product by Mitsui Fluorochemical Co.) and Polyflons D-1 and D-2 (products by Daikin Kogyo Co.) as the examples of the aqueous dispersion products.

In the compositions of the present invention, the fibrillatable fluoropolymer resin is employed in amounts of 0.1 to 3.0 parts by weight per 100 parts of components (a) and (b). The preferred range is from 0.25 to 1.0 parts by weight.

The ingredients used to make the compositions of the invention are dispersed uniformly and it has been found that melt blending the ingredients, by using such equipment as a melt extruder (e.g. single screw extruders or preferably twin screw extruders), in a separate step prior to blow molding is desirable. The blended product is pelletized (i.e., the extruded strand is quenched and cut), dried and used for subsequent blow molding purposes using an extrusion blow molding machine (e.g., made by Rocheleau Inc., Hayssen Inc., etc.) and fabricated into hollow articles such as containers. Any reactions involving the epoxide groups which may take place are apparently completed during the melt blending operation as evidenced by the large increases observed in melt viscosity and melt strength for the resulting melt blend.

Other additives as are known to those familiar with polymer compounding may be included in the composition. These additives include stabilizers, antioxidants, flame retardants, reinforcing agents such as glass fiber and flake, mineral fillers, ultraviolet light stabilizers, etc. Minor amounts of other polymers can also be incorporated in the present compositions. Examples of such polymers include aromatic polyesters (polyarylates) and polycarbonates.

EXAMPLES

EXAMPLE I

This example illustrates the preparation of a blow molding PBT resin from poly(butylene terephthlate) (PBT), ethylene/butyl acrylate/glycidyl methacrylate (E/BA/GMA) terpolymer, a low concentration of zinc acetate as a catalyst and a low level of fibrillatable Teflon ® fluoropolymer resin.

To 82.5 parts of poly(butylene terephthalate) having a melt index (as measured by ASTM Method D1238 at 240° C. using a 2160 gram weight) of 6-7 gm/10 minutes were added 15 parts of an ethylene/27% n-butyl acrylate/4.9% glycidyl methacrylate terpolymer (EBAGMA), 2.94% of PBT in which was dispersed 16% of a zinc ionomer derived from a 90% ethylene/10% methacrylic acid copolymer in which 71% of the acid groups have been converted to the corresponding zinc salt.), 0.75% Teflon ® 6C, a fibrillatable type poly-tetrafluoroethylene, 0.1 parts of tetrakis [methylene (3,5-di-tert-butyl-4-hydroxyhydrocinnamate)] methane, an antioxidant (Irganox 1010, Ciba-Geigy) and 0.3 parts bis(2,4-di-t-butylphenyl)pentaerythritol diphosphite (Ultranox 626, Borg Warner). The various ingredients were placed in a polyethylene bag and tumbled to mix. The resulting dry blend was melt blended on a Werner and Pfleiderer twin screw extruder having a diameter of 28 mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die. The extruder barrel an die were set at a temperature of 260° C. and the resin extruded at a rate of 16 pounds per hour. Temperature of the melt exiting the extruder die measured at 316° C. The melt strand exiting the extruder was quenched in water and cut into pellets. The pelletized product was dried in a vacuum oven set at 120° C. and purged with a slight nitrogen sweep overnight. The product had a melt viscosity, measured using a Kayeness viscometer at 260° C. and at a shear rate of 102 sec$^{-1}$, of 34250 poise.

The dried resin was blow molded using a Hayssen blow molding machine equipped with a single screw extruder. The screw had a 2" diameter, a length to diameter ratio of 22 and a compression ratio of 3 to 1. The resin was blow molded under the following conditions:

Extruder barrel, zone 1, feed zone: 254° C.
Zone 2, transition zone: 257° C.
Zone 3, metering zone: 262° C.
Zone 4, accumulator: 254° C.
Zone 5, accumulator: 255° C.
Zone 6, die tip: 255° C.
Mold temperature: 38° C.

The resin was extruded at a screw speed of 42 rpm into the accumulator. Once the accumulator is filled, the parison is ejected from the accumulator with a drop time of about 2 seconds. The resin melt exhibited good melt strength as evidenced by the appearance of the parison which was round and showed no signs of sagging, wrinkling or draping. Upon closing the mold, the part is blown with air at 85 psi. The blown part is cooled in the mold under pressure and ejected after a total cycle time of 59 seconds. The test mold yielded a hollow rigid panel measuring 10½"×4½"×1" with flat surfaces and rounded edges.

The molded part was rigid, had reasonably smooth surfaces and was tough. Flexural modulus of the resin, measured according to ASTM 790 using injection molded specimens, was 260000 psi at room temperature.

EXAMPLE 2

This example is similar to Example 1 except that a mixture of two EBAGMA terpolymers were used in place of the 15 parts of ethylene/27% n-butyl acrylate/4.9% glycidyl methacrylate terpolymer.

The procedure described in Example 1 was followed except that 7.5 parts rather than 15 parts of an ethylene/27% n-butyl acrylate/4.9% glycidyl methacrylate terpolymer were used along with 7.5 parts of an ethylene/27% n-butyl acrylate/1.9% glycidyl methacrylate terpolymer.

The blend, compounded by a procedure similar to that described in Example 1, had a melt viscosity measured at 260° C. and at a shear rate of 102 sec$^{-1}$ of 25630 poise. Flexural modulus of the resin, measured on injection molded specimens by ASTM 790, was 275000 psi at room temperature.

The resin blend was blow molded under the conditions described in Example 1. The molded part was rigid, had reasonably smooth surfaces and was tough.

Comparison Example

This example is similar to Example 1 except that the fluoropolymer resin component was not included in the formulation.

The blend, compounded by a procedure similar to that described in Example 1, had a melt viscosity measured at 260° C. and at a shear rate of 102 sec$^{-1}$ of 17050 poise. Generally, PBT formulations at this melt viscosity level, which is half that obtained in Example 1, are borderline in blow molding processibility due to marginal melt strength. Flexural modulus of the blend, measured by ASTM 790, was 245000 psi at room temperature.

I claim:

1. A melt-blend of a mixture consisting essentially of:
   (a) 85-95 parts by weight of a semicrystalline polyester;
   (b) 5-15 parts be weight of an epoxide-group containing copolymer containing recurring units of monomer of the formula (1) $CH_2=C(R)COOCH_2CHCH_2O$ wherein R=H or lower alkyl of 1-6 carbon atoms and recurring units of one or more monomers selected from the group consisting of (2) $CH_2=CHR$ where R=H, lower alkyl, or phenyl, (3) $CH_2=C(R_1)COOR_2$ where $R^1$=H or lower alkyl and $R_2$=alkyl of 1-8 carbon atoms, (4) $RCOOCH=CH_2$ where R=lower alkyl, and (5) CO;
   (c) 0.01 to 3.0 parts by weight of a source of catalytic cations selected from the group consisting of metal salts of hydrocarbon mono-, di, or poly-carboxylic acids and metal salts of organic polymers containing carboxyl groups, said cations being selected from the group consisting of $Al^{+++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$ and provided that the source of catalytic cation imparts into the melt blend 0.05 to 0.5 millimoles of catalytic cation per 100 grams of components (a) and (b) combined; and
   (d) 0.1–3.0 parts by weight of a fibrillatable polytetrafluoroethylene resin.

2. The composition of claim 1 wherein the polyester is poly(ethylene terephthalate) or poly(butylene terephthalate).

3. The composition of claim 1 wherein the source of the catalytic cations in component (c) is a zinc source.

4. A composition of claim 1 where component (a) is poly(butylene terephthalate), component (b) is a terpolymer of ethylene/butyl acrylate/glycidyl methacrylate and component (c) is the zinc salt of a copolymer of ethylene and copolymerizable unsaturated acids.

* * * * *

UNITED STATES PATENT AND TRADEMARK OFFICE
CERTIFICATE OF CORRECTION

PATENT NO. : 4,914,156
DATED : April 3, 1990
INVENTOR(S) : King L. Howe

It is certified that error appears in the above-identified patent and that said Letters Patent is hereby corrected as shown below:

In the Claims:

In Claim 1:

Col. 8, line 10, delete "$CH_2=C(R_1)COOR_2$" and insert therefor --$CH_2=C(R^1)COOR^2$--

Col. 8, line 11, after the word and, delete "$R_2$" and insert therefor --$R^2$--

Signed and Sealed this

Fifth Day of March, 1991

Attest:

HARRY F. MANBECK, JR.

Attesting Officer

Commissioner of Patents and Trademarks